(12) United States Patent
Yang et al.

(10) Patent No.: US 11,522,481 B2
(45) Date of Patent: Dec. 6, 2022

(54) MEMORY MOTOR WINDING MULTIPLEXING CONTROL METHOD AND SYSTEM FOR FLUX LINKAGE OBSERVATION

(71) Applicant: SOUTHEAST UNIVERSITY, Jiangsu (CN)

(72) Inventors: Hui Yang, Jiangsu (CN); Guangxu Li, Jiangsu (CN); Heyun Lin, Jiangsu (CN); Shukang Lv, Jiangsu (CN)

(73) Assignee: SOUTHEAST UNIVERSITY, Jiangsu (CN)

( * ) Notice: Subject to any disclaimer, the term of this patent is extended or adjusted under 35 U.S.C. 154(b) by 0 days.

(21) Appl. No.: 17/289,749

(22) PCT Filed: Apr. 8, 2019

(86) PCT No.: PCT/CN2019/081819
§ 371 (c)(1),
(2) Date: Apr. 29, 2021

(87) PCT Pub. No.: WO2020/181603
PCT Pub. Date: Sep. 17, 2020

(65) Prior Publication Data
US 2022/0006404 A1 Jan. 6, 2022

(30) Foreign Application Priority Data
Mar. 13, 2019 (CN) .......................... 201910188100.4

(51) Int. Cl.
*H02P 21/00* (2016.01)
*H02P 21/14* (2016.01)
(Continued)

(52) U.S. Cl.
CPC ........ *H02P 21/141* (2013.01); *H02P 21/0003* (2013.01); *H02P 21/12* (2013.01); *H02P 21/22* (2016.02)

(58) Field of Classification Search
CPC ...... H02P 21/12; H02P 21/0003; H02P 21/22; H02P 21/141; H02P 25/022; H02P 2207/05
See application file for complete search history.

(56) References Cited

U.S. PATENT DOCUMENTS

| 4,814,677 A | * | 3/1989 | Plunkett | .................... | H02P 6/08 318/400.02 |
| 2008/0129243 A1 | * | 6/2008 | Nashiki | .................... | H02K 3/28 318/701 |

(Continued)

FOREIGN PATENT DOCUMENTS

| CN | 101388639 | 3/2009 |
| CN | 106992729 | 7/2017 |
| CN | 109150022 | 1/2019 |

OTHER PUBLICATIONS

"International Search Report (Form PCT/ISA/210) of PCT/CN2019/081819," dated Nov. 29, 2019, pp. 1-4.

*Primary Examiner* — Kawing Chan
*Assistant Examiner* — Gabriel Agared
(74) *Attorney, Agent, or Firm* — JCIP Global Inc.

(57) ABSTRACT

A memory motor winding multiplexing control method and system for flux linkage observation. The method comprises the following steps: I: when the magnetization state of a memory motor needs to be adjusted, selecting a flux regulation current reference value according to a rotation speed of the motor; II: by means of current feedback control, driving a direct-current flux regulation winding to generate a flux regulation current so as to adjust the magnetization state of a permanent magnet; III: when the memory motor is (Continued)

operating normally, collecting an induction voltage of the flux regulation winding and extracting an induced electromotive force of the flux regulation winding; and IV: using the induced electromotive force of the flux regulation winding to calculate the flux linkage of the permanent magnet for vector control of the motor.

8 Claims, 3 Drawing Sheets

(51) Int. Cl.
*H02P 21/22* (2016.01)
*H02P 21/12* (2016.01)

(56) References Cited

U.S. PATENT DOCUMENTS

| | | | |
|---|---|---|---|
| 2013/0069568 A1* | 3/2013 | Krefta | H02P 21/06 |
| | | | 318/400.02 |
| 2014/0049201 A1* | 2/2014 | Hirono | H02P 6/10 |
| | | | 318/400.23 |
| 2017/0070171 A1* | 3/2017 | Tsukakoshi | H02P 21/24 |
| 2017/0163194 A1* | 6/2017 | Sakamoto | H02P 21/00 |
| 2019/0044466 A1* | 2/2019 | Sato | H02P 29/00 |
| 2019/0074781 A1* | 3/2019 | Tsukamoto | H02P 6/182 |

* cited by examiner

MEMORY MOTOR WINDING MULTIPLEXING CONTROL METHOD AND SYSTEM FOR FLUX LINKAGE OBSERVATION

CROSS-REFERENCE TO RELATED APPLICATION

This application is a 371 of international application of PCT application serial no. PCT/CN2019/081819, filed on Apr. 8, 2019, which claims the priority benefits of China Patent Application No. 201910188100.4, filed on Mar. 13, 2019. The entirety of each of the above mentioned patent applications is hereby incorporated by reference herein and made a part of this specification.

BACKGROUND

Technical Field

The present invention relates to the technical field of motor control, in particular to memory motor winding multiplexing control method and system for flux linkage observation.

Description of Related Art

Variable flux memory motors (VFMMs) are permanent magnet motors that can widen the speed regulation range by altering the magnetization level of the permanent magnet. This kind of motors alter the magnetization state of the low coercivity permanent magnet by applying instantaneous flux regulation current pulses by an armature winding or additional flux regulation winding, and overcome the problem that the air-gap magnetic field in traditional permanent magnet synchronous motors (PMSMs) can't be regulated. Compared with hybrid excitation motors, a memory motor doesn't require continuous excitation current, thus has little or no electro-magnetic excitation loss. As new-concept permanent magnet motors, memory motors are expected to provide new wide-range drive systems of permanent magnet motors in application domains such as electric automobiles, wind power generation, high-speed machine tools and flywheel energy storage.

Direct-current flux regulation memory motors are memory motors with a separate flux regulation winding, which alter the magnetization state of the low coercivity permanent magnet by applying current pulses to the flux regulation winding, and have an advantage of simple and accurate flux regulation. Owing to the fact that the flux regulation winding of a direct-current flux regulation memory motor plays its role only when the flux regulation operation is required but remains in a redundant state in most of the operation time, the utilization of the entire flux regulation system is poor.

SUMMARY

Object of the Invention: to solve the problems existing in the prior art, the present invention provides a memory motor winding multiplexing control method and system for flux linkage observation, which utilize a flux regulation winding that is in a redundant state in a non-flux regulation period as a winding for flux linkage observation, so as to realize a flux linkage observation function for the permanent magnet and improve the utilization and anti-interference performance of the control system.

Technical Solution: the memory motor winding multiplexing control method for flux linkage observation provided by the present invention comprises the following steps:

step 1: selecting a flux regulation current reference value $i^*_f$ in a flux regulation current look-up table according to a rotation speed $\omega_m$ of the motor when the magnetization state of the permanent magnet of the memory motor needs to be adjusted;

step 2: driving a direct-current flux regulation winding to generate a flux regulation current by means of current chopping control according to the flux regulation current reference value $i^*_f$ and the flux regulation current actual value $i_f$ obtained in the step 1, thereby adjusting the magnetization state of the permanent magnet of the memory motor;

step 3: acquiring the induced voltage $u_f$ of the direct-current flux regulation winding when the memory motor operates normally, and extracting an induced electromotive force $e_f$ of the flux regulation winding according to the induced voltage $u_f$ of the direct-current flux regulation winding;

step 4: calculating the flux linkage $\psi_{pm}$ of the permanent magnet according to the induced electromotive force $e_f$ of the flux regulation winding obtained in the step 3, and performing vector control on the memory motor according to the flux linkage $\psi_{pm}$ of the permanent magnet.

Furthermore, the flux regulation current look-up table in the step 1 is acquired with the following method:

S1.1 selecting k magnetization states $\psi_{MS1}$, $\psi_{MS2}$, ..., $\psi_{MSk}$ and corresponding rotation speed values $\omega_{m1}$, $\omega_{m2}$, ..., $\omega_{mk}$ to form a discrete correspondence relationship according to the mechanical features of the memory motor in different magnetization states of the permanent magnet;

S1.2 measuring the flux regulation current values $i_{f1}$, $i_{f2}$, ..., $i_{fk}$ corresponding to the k magnetization states described in the step S1.1 by means of offline experiments;

S1.3 storing the discrete correspondence relationship between the rotation speed values $\omega_{m1}$, $\omega_{m2}$, ..., $\omega_{mk}$ comic described in the step S1.1 and the flux regulation current values $i_{f1}$, $i_{f2}$, ..., $i_{fk}$ described in the step S1.2 into the flux regulation current look-up table.

Furthermore, the current chopping control in the step 2 is a control method for generating a switching signal by performing hysteresis comparison between the flux regulation current actual value $i_f$ and the selected flux regulation current reference value $i^*_f$.

Furthermore, the induced electromotive force $e_f$ of the flux regulation winding is extracted in the step 3 with the following method specifically:

S3.1 obtaining observed d-axis current $\hat{i}_d$ with a formula $$\hat{i}_d = \frac{2}{3} \int \frac{u_f - \hat{e}_f}{M_{sf}} dt$$

in the current cycle, wherein $M_{sf}$ is the mutual inductance of the direct-current flux regulation winding to the stator, and $\hat{e}_f$ is the observed induced electromotive force of the direct-current flux regulation winding, which is obtained from a delayed feedback of the output from a Proportional Integral (PI) regulator in the previous cycle;

S3.2 comparing the observed d-axis current $\hat{i}_d$ with the actual d-axis current $i_d$ to obtain an error, inputting the error to the PI regulator to obtain an output from the PI regulator, which is the observed induced electromotive force $\hat{e}_f$ of the direct-current flux regulation winding in the current cycle;

S3.3 differentiating the observed induced electromotive force $\hat{e}_f$ of the direct-current flux regulation winding obtained in the step S3.2, and taking the obtained differential value as a feedback for participating in the calculation in the next cycle.

Furthermore, the flux linkage $\psi_{pm}$ of the permanent magnet is calculated in the step 4 with the following method specifically:

S4.1 inputting the induced electromotive force $e_f$ of the flux regulation winding into a single-phase phase-locked loop (PLL), and separating a q-axis component $e_{f\_q}$ of the induced electromotive force of the flux regulation winding, so as to obtain a d-axis component $e_{f\_d}$ of the induced electromotive force of the flux regulation winding;

S4.2 calculating the flux linkage $\psi_f$ of the flux regulation winding with a formula $\psi_f = K_e \omega_e e_{f\_d}$, wherein $K_e$ and $\omega_e$ are electromotive force coefficient and electric angular speed respectively, and the electromotive force coefficient $K_e$ is obtained through offline experiments;

S4.3 subtracting the flux linkage $\psi_d$ of the d-axis stator from the flux linkage $\psi_f$ of the flux regulation winding to obtain the flux linkage $\omega_{pm}$ of the permanent magnet.

The memory motor winding multiplexing control system for flux linkage observation provided by the present invention comprises:

a flux regulation current reference value selection module configured to select a flux regulation current reference value $i^*_f$ in the flux regulation current look-up table according to the rotation speed $\omega_m$ of the motor when the magnetization state of the permanent magnet of a memory motor needs to be adjusted;

a current chopping control module configured to drive a direct-current flux regulation winding by means of current chopping control to generate flux regulation current according to the flux regulation current reference value $i^*_f$ outputted from the flux regulation current reference value selection module and the flux regulation current actual value $i_f$, thereby adjusting the magnetization state of the permanent magnet of the memory motor;

an induced electromotive force extraction module configured to acquire the induced voltage $u_f$ of the direct-current flux regulation winding and extract the induced electromotive force $e_f$ of the flux regulation winding according to the induced voltage $u_f$ when the memory motor operates normally;

a permanent magnet flux linkage calculation module configured to calculate the flux linkage $\omega_{pm}$ of the permanent magnet according to the induced electromotive force $e_f$ of the flux regulation winding outputted from the induced electromotive force extraction module, so as to perform vector control on the memory motor according to the flux linkage $\omega_{pm}$ of the permanent magnet.

Furthermore, the flux regulation current look-up table is acquired with the following method:

S1.1 selecting k magnetization states $\psi_{MS1}, \psi_{MS2}, \ldots, \psi_{MSk}$ and corresponding rotation speed values $\omega_{m1}, \omega_{m2}, \ldots, \omega_{mk}$ to form a discrete correspondence relationship according to the mechanical features of the memory motor in different magnetization states of the permanent magnet;

S1.2 measuring the flux regulation current values $i_{f1}, i_{f2}, \ldots, i_{fk}$ corresponding to the k magnetization states described in the step S1.1 by means of offline experiments;

S1.3 storing the discrete correspondence relationship between the rotation speed values $\omega_{m1}, \omega_{m2}, \ldots, \omega_{mk}$ described in the step S1.1 and the flux regulation current values $i_{f1}, i_{f2}, \ldots, i_{fk}$ described in the step S1.2 into the flux regulation current look-up table.

Furthermore, the current chopping control is specifically a control method for generating a switching signal by performing hysteresis comparison between the flux regulation current actual value $i_f$ and the selected flux regulation current reference value $i^*_f$.

Furthermore, the induced electromotive force extraction module specifically comprises:

an observed d-axis current calculation unit configured to implement a formula $$\hat{i}_d = \frac{2}{3} \int \frac{u_f - \hat{e}_f}{M_{sf}} dt$$

to calculate the observed d-axis current $\hat{i}_d$, wherein $M_{sf}$ is the mutual inductance of the direct-current flux regulation winding to the stator, and $\hat{e}_f$ is the observed induced electromotive force of the direct-current flux regulation winding, which is obtained through feedback from a time delay unit;

a comparator configured to compare the observed d-axis current $\hat{i}_d$ with the actual d-axis current $i_d$ to obtain an error and then input the error to an PI regulator;

a PI regulator configured to perform proportional and integral control to output the observed induced electromotive force $\hat{e}_f$ of the direct-current flux regulation winding in the current cycle according to the output from the comparator, wherein the output from the PI regulator is the actual induced electromotive force $e_f$ of the direct-current flux regulation winding when the observed d-axis current $\hat{i}_d$ is equal to the actual d-axis current $i_d$;

a time delay unit configured to delay the output from the PI regulator and feed the output back to the observed d-axis current calculation unit for participating in the calculation in the next cycle.

Furthermore, the permanent magnet flux linkage calculation module specifically comprises:

a single-phase phase-locked loop (PLL) configured to separate a q-axis component $e_{f\_q}$ of the induced electromotive force of the flux regulation winding from the induced electromotive force $e_f$ of the flux regulation winding, so as to obtain a d-axis component $e_{f\_d}$ of the induced electromotive force of the flux regulation winding;

a direct-current flux regulation winding flux linkage calculation unit configured to implement a formula $\psi_f = K_e \omega_e e_{f\_d}$ to obtain the flux linkage $\omega_f$ of the direct-current flux regulation winding, wherein $K_e$ and $\omega_e$ are electromotive force coefficient and electric angular speed respectively, and the electromotive force coefficient $K_e$ is obtained through offline experiments;

an adder configured to subtract the flux linkage $\psi_d$ of the d-axis stator from the flux linkage $\psi_f$ of the direct-current flux regulation winding to obtain the flux linkage $\psi_{pm}$ of the permanent magnet.

Beneficial effects: compared with the prior art, the present invention has the following significant advantages:

1. Under a winding multiplexing principle, a direct-current flux regulation winding that is in a redundant state in the non-flux regulation period is utilized as a winding for flux linkage observation, so as to improve the utilization efficiency of the direct-current flux regulation memory motor;

2. Compared with the existing rotor flux linkage observation technique in the prior art, the current in the winding is almost zero when flux linkage observation is carried out with the direct-current flux regulation winding. Therefore, the back electromotive force can be acquired more easily, and the accuracy of rotor flux linkage observation is improved;

3. The flux linkage of the permanent magnet is used in a vector control system for feed-forward decoupling of the closed loop current regulator, thus the interference of flux linkage variations on the control of q-axis current is reduced, the stability of the control system is improved, and the dynamic performance of the speed regulation system is improved.

DESCRIPTION OF THE EMBODIMENTS

Figure 1:
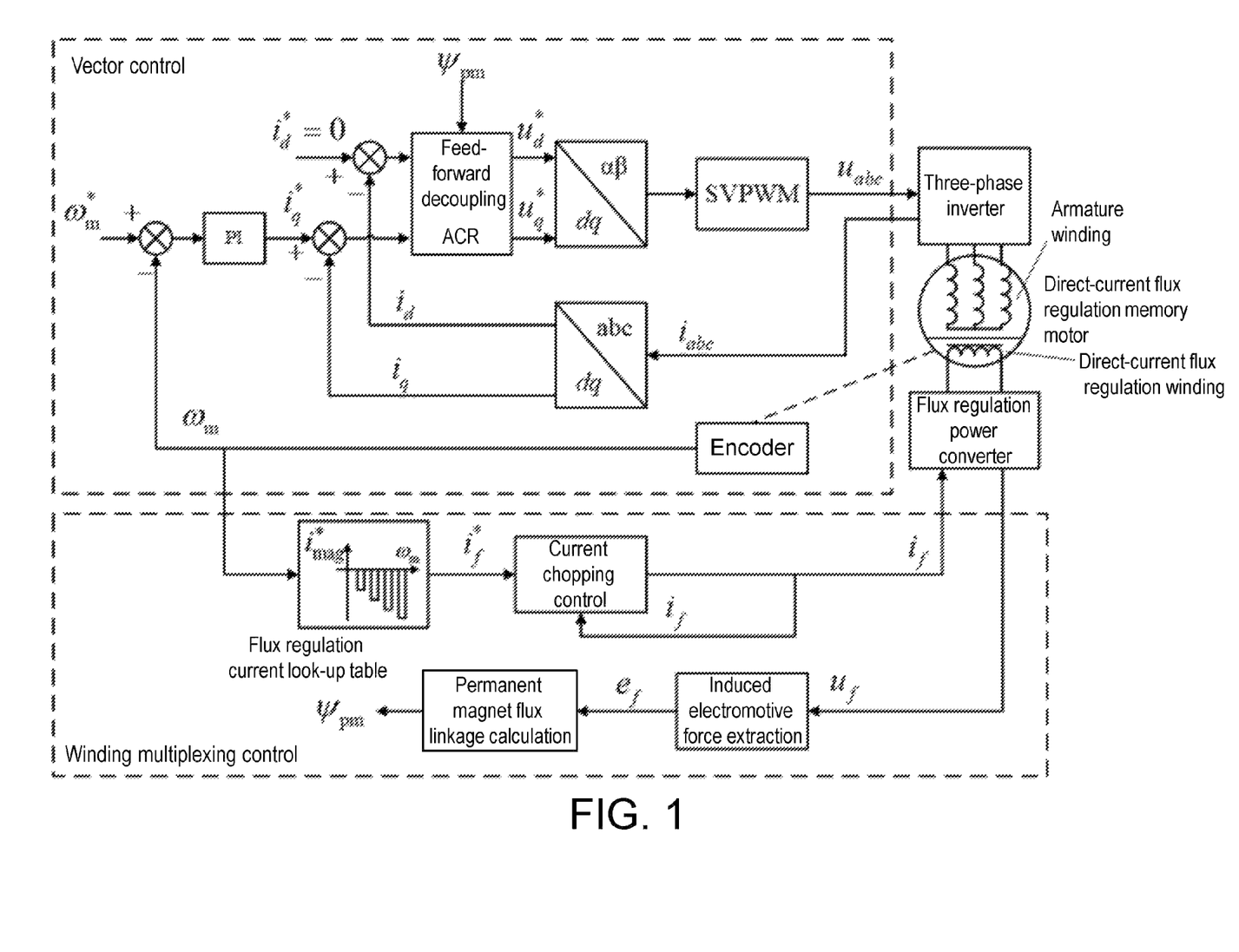
FIG. 1 is a schematic diagram of the control system in an embodiment of the present invention.

In an embodiment of the present invention, the present invention provides a memory motor winding multiplexing control method for flux linkage observation, in which the controlled object is a direct-current flux regulation memory motor, the control process is shown in FIG. 1, and an armature winding and a direct-current flux regulation winding are components installed in the motor; a three-phase inverter is driven in a vector control mode with a space vector PWM (SVPWM) technique, a PI regulator is employed for the outer speed loop, a feed-forward decoupling regulator is employed for the inner current loop, and feed-forward decoupling is realized by utilizing the flux linkage $\psi_{pm}$ of the permanent magnet obtained through flux linkage observation; the flux regulation power converter employs an H-bridge direct-current power converter structure, and is driven by means of current chopping control in the flux regulation period to generate flux regulation current in the direct-current flux regulation winding, and thereby adjusting the magnetization state of the permanent magnet. The flux regulation power converter is cut off and a voltage sensor is utilized to acquire the voltage of the flux regulation winding to observe the flux linkage of the permanent magnet and thereby realize multiplexing control of the direct-current flux regulation winding during normal operation. Specifically, the method comprises the following steps:

step 1: selecting a flux regulation current reference value $i^*_f$ in a flux regulation current look-up table according to a rotation speed $\omega_m$ of the motor when the magnetization state of the permanent magnet of a memory motor needs to be adjusted;

Wherein, the flux regulation current look-up table is acquired with the following method:

S1.1 selecting k magnetization states $\psi_{MS1}$, $\psi_{MS2}$, ..., $\psi_{MSk}$ and corresponding rotation speed values $\omega_{m1}$, $\omega_{m2}$, ..., $\omega_{mk}$ to form a discrete correspondence relationship according to the mechanical features of the memory motor in different magnetization states of the permanent magnet;

S1.2 measuring the flux regulation current values $i_{f1}$, $i_{f2}$, ..., $i_{fk}$ corresponding to the k magnetization states described in the step S1.1 by means of offline experiments;

S1.3 storing the discrete correspondence relationship between the rotation speed values $\omega_{m1}$, $\omega_{m2}$, ..., $\omega_{mk}$ described in the step S1.1 and the flux regulation current values $i_{f1}$, $i_{f2}$, ..., $i_{fk}$ described in the step S1.2 into the flux regulation current look-up table.

step 2: driving a direct-current flux regulation winding to generate a flux regulation current by means of current chopping control according to the flux regulation current reference value $i^*_f$ and the flux regulation current actual value $i_f$ obtained in the step 1, thereby adjusting the magnetization state of the permanent magnet of the memory motor; the current chopping control is specifically a control method for generating a switching signal by performing hysteresis comparison between the flux regulation current actual value $i_f$ and the selected flux regulation current reference value $i^*_f$.

step 3: acquiring an induced voltage $u_f$ of the direct-current flux regulation winding when the memory motor operates normally, and extracting an induced electromotive force $e_f$ of the flux regulation winding according to the induced voltage $u_f$ of the direct-current flux regulation winding;

The voltage equation of the flux regulation winding is analyzed as follows:

$$u_f = i_f R_f + L_f \frac{di_f}{dt} + \frac{3}{2} M_{sf} \frac{di_d}{dt} + e_f \tag{1}$$

wherein, $u_f$, $i_f$, $i_d$ and $e_f$ are the induced voltage of the flux regulation winding, the current in the flux regulation winding, the d-axis current, and the induced electromotive force of the flux regulation winding respectively, and $R_f$, $L_f$ and $M_{sf}$ are the resistance of the flux regulation winding, the self-inductance of the flux regulation winding, and the mutual inductance of the flux regulation winding to the stator respectively;

in the flux linkage observer, the current $i_f$ in the flux regulation winding is 0; thus, the first two terms at the right side of the equation are omitted, and the formula (1) may be rewritten to:

$$u_f = \frac{3}{2} M_{sf} \frac{di_d}{dt} + e_f \tag{2}$$

$$\hat{i}_d = \frac{2}{3} \int \frac{u_f - \hat{e}_f}{M_{sf}} dt \tag{3}$$

Figure 2:
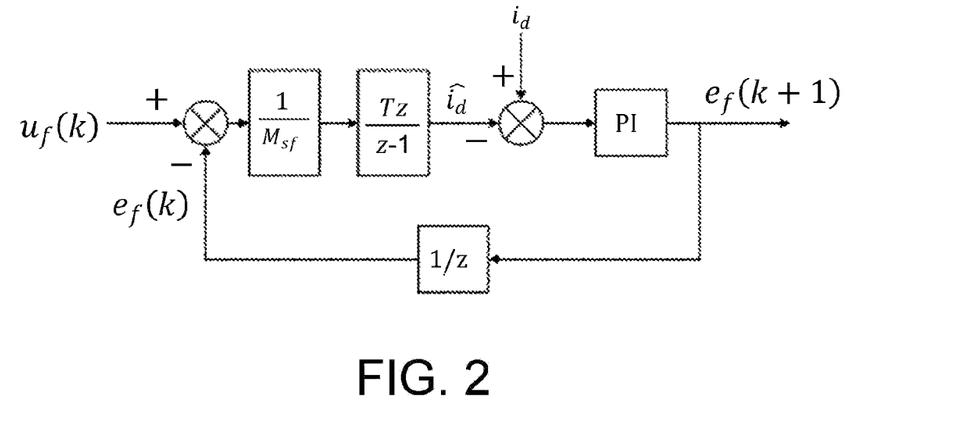
FIG. 2 is a schematic diagram of the induced electromotive force extraction step in FIG. 1.

Therefore, as shown in FIG. 2, the specific step of extracting the induced electromotive force $e_f$ of the flux regulation winding comprises:

S3.1 obtaining observed d-axis current $\hat{i}_d$ with a formula $$\hat{i}_d = \frac{2}{3} \int \frac{u_f - \hat{e}_f}{M_{sf}} dt$$

in the current cycle, wherein $M_{sf}$ is the mutual inductance of the direct-current flux regulation winding to the stator, and $\hat{e}_f$ is the observed induced electromotive force of the direct-current flux regulation winding, which is obtained from a delayed feedback of the output from a PI regulator in the previous cycle;

S3.2 comparing the observed d-axis current $\hat{i}_d$ with the actual d-axis current $i_d$ to obtain an error, inputting the error to the PI regulator to obtain an output from the PI regulator, which is the observed induced electromotive force $\hat{e}_f$ of the direct-current flux regulation winding in the current cycle;

S3.3 differentiating the observed induced electromotive force $\hat{e}_f$ of the direct-current flux regulation winding obtained in the step S3.2, and taking the obtained differential value as a feedback for participating in the calculation in the next cycle;

step 4: calculating the flux linkage $\psi_{pm}$ of the permanent magnet according to the induced electromotive force $e_f$ of the flux regulation winding obtained in the step 3, and performing vector control on the memory motor according to the flux linkage $\psi_{pm}$ of the permanent magnet.

Figure 3:
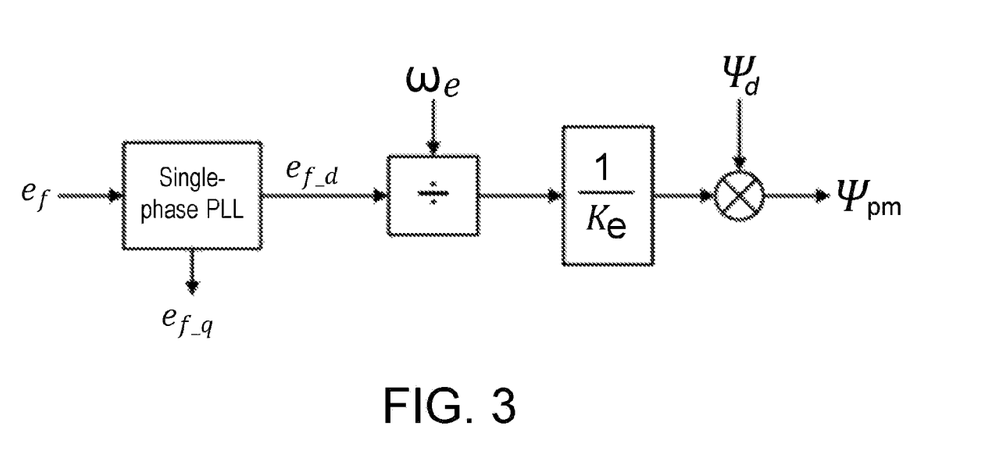
FIG. 3 is a schematic diagram of the permanent magnet flux linkage calculation step in FIG. 1.

The induced electromotive force $e_f$ of the flux regulation winding consists of a permanent magnet flux linkage induced component, a d-axis flux linkage induced component, and a q-axis flux linkage induced component, and may be expressed as:

$$e_f = e_{f\_d} + e_{f\_q} \quad (4)$$
$$= (E_{f\_\psi d} + E_{f\_pm})\cos\omega_e t + E_{f\_\psi q}\sin\omega_e t$$

wherein, $e_{f\_d}$ and $e_{f\_q}$ are the d-axis component and q-axis component of the induced electromotive force of the flux regulation winding, $E_{f\_\psi d}$, $E_{f\_pm}$ and $E_{f\_\psi q}$ are the amplitudes of the electromotive force components induced by the d-axis flux linkage, permanent magnet flux linkage, and q-axis flux linkage in the flux regulation winding, wherein the amplitude $E_{f\_pm}$ of the electromotive force component induced by the permanent magnet flux linkage in the flux regulation winding includes the flux linkage $\psi_{pm}$ of the permanent magnet to be solved, and the relationship may be expressed as follows:

$$E_{f\_d} = E_{f\_\psi d} + E_{f\_pm} \quad (5)$$
$$= \omega_e K_e(\psi_{pm} + i_d L_d)$$

wherein, $E_{f\_d}$ is the amplitude of the d-axis component of the induced electromotive force of the flux regulation winding, and the flux linkage $\psi_{pm}$ of the permanent magnet may be calculated according to the formulae (4) and (5) through the following steps, as shown in FIG. 3:

S4.1 inputting the induced electromotive force $e_f$ of the flux regulation winding into a single-phase PLL, and separating a q-axis component $e_{f\_q}$ of the induced electromotive force of the flux regulation winding, so as to obtain a d-axis component $e_{f\_d}$ of the induced electromotive force of the flux regulation winding;

S4.2 calculating the flux linkage $\psi_f$ of the flux regulation winding with a formula $\psi_f = K_e\omega_e e_{f\_d}$, wherein $K_e$ and $\omega_e$ are electromotive force coefficient and electric angular speed respectively, and the electromotive force coefficient $K_e$ is obtained through offline experiments;

S4.3 subtracting the flux linkage $\psi_d$ of the d-axis stator from the flux linkage $\psi_f$ of the flux regulation winding to obtain the flux linkage $\psi_{pm}$ of the permanent magnet.

Figure 4:
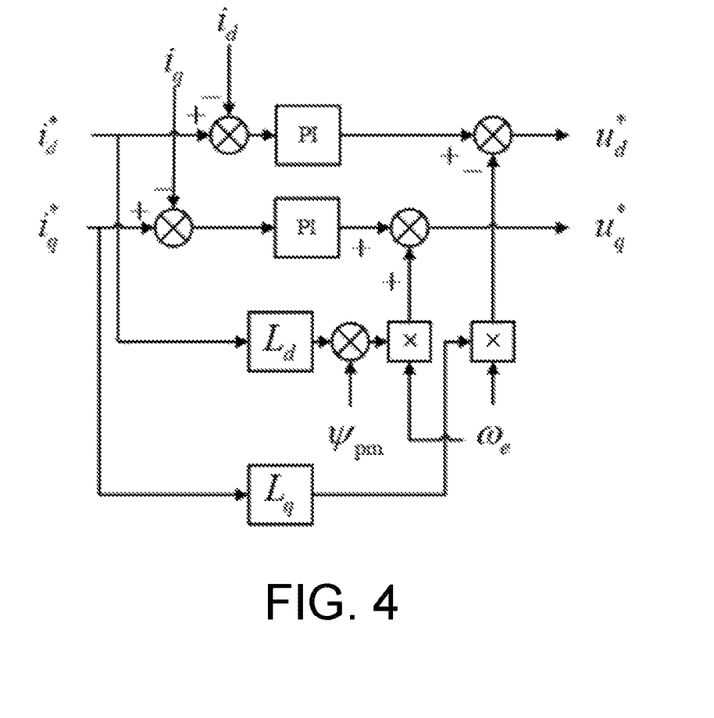
FIG. 4 is a schematic diagram of the feed-forward decoupling regulation step in FIG. 1.

The process of vector control on the memory motor according to the flux linkage $\psi_{pm}$ of the permanent magnet is shown in FIGS. 1 and 4, wherein a PI regulator is employed for the outer speed loop, a feed-forward decoupling regulator is employed for the inner current loop, and feed-forward decoupling is realized by utilizing the flux linkage $\psi_{pm}$ of the permanent magnet obtained through flux linkage observation. The voltage equation in the dq coordinate system is as follows:

$$u_d = R_s i_d + L_d \frac{di_d}{dt} - \omega_e(\psi_{pm} + i_d L_d) \quad (6)$$
$$u_q = R_s i_q + L_q \frac{di_q}{dt} + \omega_e i_q L_q$$

wherein, $R_s$, $L_d$ and $L_q$ are the resistance of the stator, d-axis self-inductance, and q-axis self-inductance respectively, and $u_d$, $u_q$, $i_d$, $i_q$, $\psi_e$ and $\psi_{pm}$ are the d-axis voltage, q-axis voltage, d-axis current, q-axis current, electric angular speed, and flux linkage of the permanent magnet respectively; to realize decoupling control on the d-axis current and q-axis current, the respective current should be set to be $i^*_d$ and $i^*_q$ and voltage decoupling should be carried out to obtain control variables $u^*d$ and $u^*_q$ in voltage form, then the formula (6) may be rewritten to:

$$u_d^* = u_{d\_ref} - \omega_e(\psi_{pm} + i_d^* L_d)$$
$$u_q^* = u_{q\_ref} + \omega_e i_q^* L_q \quad (7)$$

wherein, $u^*_d$ and $u^*_q$ are set values of d-axis voltage and q-axis voltage respectively, $u_{d\_ref}$ and $u_{q\_ref}$ are the outputs of the PI regulators in the d-axis current loop and q-axis current loop respectively, $i^*_d$ and $i^*_q$ are set values of d-axis current and q-axis current, then the feed-forward decoupling regulator in the current loop may be established according to the formula (7), specifically with the following method: the errors between the set values $i^*_d$ and $i^*_q$ of d-axis current and q-axis current and the actual feedback values of d-axis current and q-axis current are inputted to two PI regulators respectively, to obtain the outputs $u_{d\_ref}$ and $u_{q\_ref}$ of the PI regulators in d-axis current loop and q-axis current loop; with the flux linkage $\psi_{pm}$ of the permanent magnet and the electric angular speed $\omega_e$, the set values $u^*_d$ and $u^*_q$ of d-axis voltage and q-axis voltage are calculated according to the formula (7), and thereby feed-forward decoupling control is realized.

In an embodiment of the present invention, the present invention further provides a memory motor winding multiplexing control system for flux linkage observation, corresponding to the method described above. The system comprises:

a flux regulation current reference value selection module configured to select a flux regulation current reference value $i^*_f$ in the flux regulation current look-up table according to the rotation speed $\omega_m$ of the motor when the magnetization state of the permanent magnet of a memory motor needs to be adjusted;

a current chopping control module configured to drive a direct-current flux regulation winding by means of current chopping control to generate flux regulation current according to the flux regulation current reference value $i^*_f$ outputted from the flux regulation current reference value selection module and the flux regulation current actual value $i_f$, thereby adjusting the magnetization state of the permanent magnet of the memory motor; the current chopping control is specifically a control method for generating a switching signal by performing hysteresis comparison between the flux regulation current actual value $i_f$ and the selected flux regulation current reference value $i^*_f$;

an induced electromotive force extraction module configured to acquire an induced voltage $u_f$ of the direct-current flux regulation winding and extract the induced electromotive force $e_f$ of the flux regulation winding according to the induced voltage $u_f$ when the memory motor operates normally;

a permanent magnet flux linkage calculation module configured to calculate the flux linkage $\psi_{pm}$ of the permanent magnet according to the induced electromotive force $e_f$ of the flux regulation winding outputted from the induced electromotive force extraction module, so as to perform vector control on the memory motor according to the flux linkage $\psi_{pm}$ of the permanent magnet.

Wherein, the flux regulation current look-up table is acquired with the following method:

S1.1 selecting k magnetization states $\psi_{MS1}$, $\psi_{MS2}$, ..., $\psi_{MSk}$ and corresponding rotation speed values $\omega_{m1}$, $\omega_{m2}$, ..., $\omega_{mk}$ to form a discrete correspondence relationship according to the mechanical features of the memory motor in different magnetization states of the permanent magnet;

S1.2 measuring the flux regulation current values $i_{f1}$, $i_{f2}$, ..., $i_{fk}$ corresponding to the k magnetization states described in the step S1.1 by means of offline experiments;

S1.3 storing the discrete correspondence relationship between the rotation speed values $\omega_{m1}$, $\omega_{m2}$, ..., $\omega_{mk}$ described in the step S1.1 and the flux regulation current values $i_{f1}$, $i_{f2}$, $i_{fk}$ described in the step S1.2 into the flux regulation current look-up table.

Wherein, the induced electromotive force extraction module specifically comprises:

an observed d-axis current calculation unit configured to implement a formula $$\hat{i}_d = \frac{2}{3} \int \frac{u_f - \hat{e}_f}{M_{sf}} dt$$

to calculate the observed d-axis current $\hat{i}_d$, wherein $M_{sf}$ is the mutual inductance of the direct-current flux regulation winding to the stator, and $\hat{e}_f$ is the observed induced electromotive force of the direct-current flux regulation winding, which is obtained through a feedback from a time delay unit;

a comparator configured to compare the observed d-axis current $\hat{i}_d$ with the actual d-axis current $i_d$ to obtain an error and then input the error to a PI regulator;

a PI regulator configured to perform proportional and integral control to output the observed induced electromotive force $\hat{e}_f$ of the direct-current flux regulation winding in the current cycle according to the output from the comparator, wherein the output from the PI regulator is the actual induced electromotive force $e_f$ of the direct-current flux regulation winding when the observed d-axis current $\hat{i}_d$ is equal to the actual d-axis current $i_d$;

a time delay unit configured to delay the output from the PI regulator and feed the output back to the observed d-axis current calculation unit for participating in the calculation in the next cycle.

Wherein, the permanent magnet flux linkage calculation module specifically comprises:

a single-phase PLL configured to separate a q-axis component $e_{f\_q}$ of the induced electromotive force of the flux regulation winding from the induced electromotive force $e_f$ of the flux regulation winding, so as to obtain a d-axis component $e_{f\_d}$ of the induced electromotive force of the flux regulation winding;

a direct-current flux regulation winding flux linkage calculation unit configured to implement a formula $\psi_f = K_e \omega_e e_{f\_d}$ to obtain the flux linkage $\psi_f$ of the direct-current flux regulation winding, wherein $K_e$ and $\omega_e$ are electromotive force coefficient and electric angular speed respectively, and the electromotive force coefficient $K_e$ is obtained through offline experiments;

an adder configured to subtract the flux linkage $\psi_d$ of the d-axis stator from the flux linkage $\psi_f$ of the direct-current flux regulation winding to obtain the flux linkage $\psi_{pm}$ of the permanent magnet.

It should be understood that the system and method disclosed in the embodiments of the present application may be implemented in other ways. The embodiment of the system described above is only exemplary. For example, the division of the modules and units is only a division in term of logic function, and may be implemented in other ways in the actual implementation. For example, a plurality of units or components may be combined or integrated into another system, or some features may be omitted or not implemented. Besides, the illustrated or discussed coupling or direct coupling or communication connection between the devices or units may be implemented via some interfaces, and the indirect coupling or communication connection between the devices or units may be electrical, mechanical, or in other forms.

Those skilled in the art can further aware that the exemplary units and algorithm steps described in the embodiments disclosed herein may be implemented by electronic hardware, computer software or a combination thereof, and software modules may reside in random access memory (RAM), memory, read only memory (ROM), electrically programmable ROM, electrically erasable and programmable ROM, registers, hard disk, removable disk, CD-ROM, or any other form of storage media well-known in the art.

The embodiments are disclosed and described above for the purpose of enabling those skilled in the art to implement or use the present invention. It is obvious to those skilled in the art that various modifications can be made to those embodiments. The general principle defined herein may be implemented in other embodiments without departing from the spirit or scope of the present invention. Therefore, the scope of the present invention should not be limited to those embodiments illustrated herein, but should be comprehended as the broadest scope consistent with the principle and novel features disclosed herein.

What is claimed is:

1. A memory motor winding multiplexing control method for flux linkage observation, comprising the following steps:

step 1: selecting a flux regulation current reference value $i^*_f$ in a flux regulation current look-up table according to a rotation speed $\omega_m$ of the motor when the magnetization state of the permanent magnet of a memory motor needs to be adjusted;

step 2: driving a direct-current flux regulation winding to generate a flux regulation current by means of current chopping control according to the flux regulation current reference value $i^*_f$, which is obtained in the step 1, and the flux regulation current actual value $i_f$, thereby adjusting the magnetization state of the permanent magnet of the memory motor;

step 3: acquiring an induced voltage $u_f$ of the direct-current flux regulation winding when the memory motor operates normally, and extracting an induced electromotive force $e_f$ of the flux regulation winding according to the induced voltage $u_f$ of the direct-current flux regulation winding;

step 4: calculating the flux linkage $\psi_{pm}$ of the permanent magnet according to the induced electromotive force $e_f$ of the flux regulation winding obtained in the step 3, and performing vector control on the memory motor according to the flux linkage $\psi_{pm}$ of the permanent magnet;

wherein the flux regulation current look-up table in the step 1 is acquired with the following method:

S1.1 selecting k magnetization states $\psi_{MS1}$, $\psi_{MS2}$, ..., $\psi_{MSk}$ and corresponding rotation speed values $\omega_{m1}$, $\omega_{m2}$, ..., $\omega_{mk}$ to form a discrete correspondence relationship according to the mechanical features of the memory motor in different magnetization states of the permanent magnet;

S1.2 measuring the flux regulation current values $i_{f1}$, $i_{f2}$, ..., $i_{fk}$ corresponding to the k magnetization states described in the step S1.1 by means of offline experiments;

S1.3 storing the discrete correspondence relationship between the rotation speed values $\omega_{m1}$, $\omega_{m2}$, ..., $\omega_{mk}$ described in the step S1.1 and the flux regulation current values $i_{f1}$, $i_{f2}$, ..., $i_{fk}$ described in the step S1.2 into the flux regulation current look-up table.

2. The control method according to claim 1, wherein the current chopping control in the step 2 is a control method for generating a switching signal by performing hysteresis comparison between the flux regulation current actual value $i_f$ and the selected flux regulation current reference value $i^*_f$.

3. The control method according to claim 1, wherein the induced electromotive force $e_f$ of the flux regulation winding is extracted in the step 3 with following method specifically:

S3.1 obtaining observed d-axis current $\hat{i}_d$ with a formula $$\hat{i}_d = \frac{2}{3} \int \frac{u_f - \hat{e}_f}{M_{sf}} dt$$

in the current cycle, wherein $M_{sf}$ is the mutual inductance of the direct-current flux regulation winding to the stator, and $\hat{e}_f$ is the observed induced electromotive force of the direct-current flux regulation winding, which is obtained from a delayed feedback of the output from a Proportional Integral (PI) regulator in the previous cycle;

S3.2 comparing the observed d-axis current $\hat{i}_d$ with the actual d-axis current $i_d$ to obtain an error, inputting the error to the PI regulator to obtain an output from the PI regulator, which is the observed induced electromotive force $\bar{e}_f$ the direct-current flux regulation winding in the current cycle;

S3.3 differentiating the observed induced electromotive force $\hat{e}_f$ of the direct-current flux regulation winding obtained in the step S3.2, and taking the obtained differential value as a feedback for participating in the calculation in the next cycle.

4. The control method according to claim 1, wherein the flux linkage $\psi_{pm}$ of the permanent magnet is calculated in the step 4 with the following method specifically:

S4.1 inputting the induced electromotive force $e_f$ of the flux regulation winding into a single-phase PLL, and separating a q-axis component $e_{f\_q}$ of the induced electromotive force of the flux regulation winding, so as to obtain a d-axis component $e_{f\_d}$ of the induced electromotive force of the flux regulation winding;

S4.2 calculating the flux linkage $\psi_f$ of the flux regulation winding with a formula $\psi_f = K_e \omega_e e_{f\_d}$, wherein $K_e$ and $\omega_e$ are electromotive force coefficient and electric angular speed respectively, and the electromotive force coefficient $K_e$ is obtained through offline experiments;

S4.3 subtracting the flux linkage $\psi_d$ of the d-axis stator from the flux linkage $\psi_f$ of the flux regulation winding to obtain the flux linkage $\psi_{pm}$n of the permanent magnet.

5. A memory motor winding multiplexing control system for flux linkage observation, comprising:

a flux regulation current reference value selection circuit configured to select a flux regulation current reference value $i^*_f$ in the flux regulation current look-up table according to the rotation speed $\omega_m$ of the motor when the magnetization state of the permanent magnet of a memory motor needs to be adjusted;

a current chopping control circuit configured to drive a direct-current flux regulation winding by means of current chopping control to generate flux regulation current according to the flux regulation current reference value $i^*_f$ outputted from the flux regulation current reference value selection circuit and the flux regulation current actual value $i_f$, thereby adjusting the magnetization state of the permanent magnet of the memory motor;

an induced electromotive force extraction circuit configured to acquire an induced voltage $u_f$ of the direct-current flux regulation winding and extract the induced electromotive force $e_f$ of the flux regulation winding according to the induced voltage $u_f$ when the memory motor operates normally;

a permanent magnet flux linkage calculation circuit configured to calculate the flux linkage $\psi_{pm}$, of the permanent magnet according to the induced electromotive force $e_f$ of the flux regulation winding outputted from the induced electromotive force extraction circuit, so as to perform vector control on the memory motor according to the flux linkage $\psi_{pm}$ of the permanent magnet;

wherein the flux regulation current look-up table is acquired with the following method:

S1.1 selecting k magnetization states $\psi_{MS1}$, $\psi_{MS2}$, ..., $\psi_{MSk}$ and corresponding rotation speed values $\omega_{m1}$, $\omega_{m1}$, ..., $\omega_{mk}$ to form a discrete correspondence relationship according to the mechanical features of the memory motor in different magnetization states of the permanent magnet;

S1.2 measuring the flux regulation current values $i_{f1}$, $i_{f2}$, ..., $i_{fk}$ corresponding to the k magnetization states described in the step S1.1 by means of offline experiments;

S1.3 storing the discrete correspondence relationship between the rotation speed values $\omega_{m1}$, $\omega_{m2}$, ..., $\omega_{mk}$ described in the step S1.1 and the flux regulation current values $i_{f1}$, $i_{f2}$, ..., $i_{fk}$ described in the step S1.2 into the flux regulation current look-up table.

6. The control system according to claim 5, wherein the current chopping control is specifically a control method for generating a switching signal by performing hysteresis comparison between the flux regulation current actual value $i_f$ and the selected flux regulation current reference value $i^*_f$.

7. The control system according to claim 5, wherein the induced electromotive force extraction circuit specifically comprises:

an observed d-axis current calculation unit configured to implement a formula $$\hat{i}_d = \frac{2}{3} \int \frac{u_f - \hat{e}_f}{M_{sf}} dt$$

to calculate the observed d-axis current $\hat{i}_d$, wherein $M_{sf}$ is the mutual inductance of the direct-current flux regulation winding to the stator, and $\hat{e}_f$ is the observed induced electromotive force of the direct-current flux regulation winding, which is obtained through a feedback from a time delay unit;

- a comparator configured to compare the observed d-axis current $\hat{i}_d$ with the actual d-axis current $i_d$ to obtain an error and then input the error to a PI regulator;
- a PI regulator configured to perform proportional and integral control to output the observed induced electromotive force $\hat{e}_f$ of the direct-current flux regulation winding in the current cycle according to the output from the comparator, wherein the output from the PI regulator is the actual induced electromotive force $e_f$ of the direct-current flux regulation winding when the observed d-axis current $\hat{i}_d$ is equal to the actual d-axis current $i_d$;
- a time delay unit configured to delay the output from the PI regulator and feed the output back to the observed d-axis current calculation unit for participating in the calculation in the next cycle.

8. The control system according to claim 5, wherein the permanent magnet flux linkage calculation circuit specifically comprises:

- a single-phase PLL configured to separate a q-axis component $e_{f\_q}$ of the induced electromotive force of the flux regulation winding from the induced electromotive force $e_f$ of the flux regulation winding, so as to obtain a d-axis component $e_{f\_d}$ of the induced electromotive force of the flux regulation winding;
- a direct-current flux regulation winding flux linkage calculation unit configured to implement a formula $\psi_f = K_e \omega_e e_{f\_d}$ to obtain the flux linkage $\psi_f$ of the direct-current flux regulation winding, wherein $K_e$ and $\omega_e$ are electromotive force coefficient and electric angular speed respectively, and the electromotive force coefficient $K_e$ is obtained through offline experiments;
- an adder configured to subtract the flux linkage $\psi_d$ of the d-axis stator from the flux linkage $\psi_f$ of the direct-current flux regulation winding to obtain the flux linkage $\psi_{pm}$ of the permanent magnet.

* * * * *